(12) United States Patent
Wriedt

(10) Patent No.: US 10,912,971 B2
(45) Date of Patent: Feb. 9, 2021

(54) GOLF TEE BOX MARKER DEVICE HAVING INTERCHANGEABLE ADVERTISING PANELS

(71) Applicant: BLUE HIPPO, LLC, Orlando, FL (US)

(72) Inventor: Bradley E. Wriedt, Windermere, FL (US)

(73) Assignee: BLUE HIPPO, LLC, Orlando, FL (US)

( * ) Notice: Subject to any disclaimer, the term of this patent is extended or adjusted under 35 U.S.C. 154(b) by 0 days.

(21) Appl. No.: 16/266,763

(22) Filed: Feb. 4, 2019

(65) Prior Publication Data

US 2019/0240552 A1    Aug. 8, 2019

Related U.S. Application Data

(60) Provisional application No. 62/627,282, filed on Feb. 7, 2018.

(51) Int. Cl.
| | |
|---|---|
| *A63B 57/30* | (2015.01) |
| *A63B 57/00* | (2015.01) |
| *G06Q 30/02* | (2012.01) |
| *A63B 71/02* | (2006.01) |
| *G09F 3/20* | (2006.01) |
| *G09F 3/18* | (2006.01) |

(52) U.S. Cl.
CPC ............ *A63B 57/505* (2015.10); *A63B 57/30* (2015.10); *G06Q 30/0252* (2013.01); *A63B 2071/024* (2013.01); *G09F 3/18* (2013.01); *G09F 3/206* (2013.01)

(58) Field of Classification Search
CPC . A63B 57/505; A63B 57/30; A63B 2071/024; G06Q 30/0252
See application file for complete search history.

(56) References Cited

U.S. PATENT DOCUMENTS

| | | |
|---|---|---|
| 3,372,503 A | 3/1968 | Weeks |
| 3,553,873 A | 1/1971 | Weston |
| 4,242,823 A | 1/1981 | Bruno |
| 4,991,769 A | 2/1991 | Todd |
| 5,269,093 A * | 12/1993 | Horaguchi ............. A01G 7/045 47/58.1 R |

(Continued)

FOREIGN PATENT DOCUMENTS

WO    WO8500236    1/1985

*Primary Examiner* — Cassandra Davis
(74) *Attorney, Agent, or Firm* — Matthew G. McKinney; Allen, Dyer et al.

(57) ABSTRACT

A golf tee box marker device includes a base having a planar front surface, a steel plate secured to the planar front surface and having a first polarity, and an advertising panel comprised of a flexible material and having a second polarity. The advertising panel is removably secured to the steel plate using magnetic forces. At least one support extends from a lower portion of the base and is threaded into a lower portion of the base and configured to be pushed into a ground surface using a sharpened edge until the lower portion of the base is substantially flush to the ground surface. The base may be at an angle relative to a longitudinal axis of the pair of supports causing the advertising panel to be tilted upwards.

10 Claims, 5 Drawing Sheets

(56) References Cited

U.S. PATENT DOCUMENTS

| | | | | |
|---|---|---|---|---|
| 5,305,999 | A * | 4/1994 | Tate | A63B 57/207 |
| | | | | 473/406 |
| 5,495,686 | A * | 3/1996 | Millard | G09F 7/04 |
| | | | | 40/621 |
| 5,593,156 | A | 1/1997 | Jambor | |
| 5,769,731 | A | 6/1998 | Reimer | |
| 5,799,423 | A | 9/1998 | Malino | |
| 5,852,890 | A | 12/1998 | Pynenburg | |
| 6,217,958 | B1 * | 4/2001 | Blyden | B32B 27/30 |
| | | | | 428/31 |
| 6,553,701 | B1 * | 4/2003 | Neisen | G09F 3/12 |
| | | | | 40/645 |
| 9,934,702 | B2 * | 4/2018 | Harshman | B42D 15/027 |
| 2004/0040195 | A1 * | 3/2004 | Copley | A47G 1/0616 |
| | | | | 40/711 |
| 2005/0284011 | A1 * | 12/2005 | Todd | G09F 7/04 |
| | | | | 40/600 |
| 2006/0143964 | A1 | 7/2006 | Chatellier et al. | |
| 2008/0064518 | A1 | 3/2008 | Gibson et al. | |
| 2008/0265082 | A1 * | 10/2008 | Angiuli | A45F 5/004 |
| | | | | 242/400 |
| 2010/0101274 | A1 | 4/2010 | Worth | |
| 2014/0311000 | A1 * | 10/2014 | Disney | G09F 7/18 |
| | | | | 40/600 |

\* cited by examiner

GOLF TEE BOX MARKER DEVICE HAVING INTERCHANGEABLE ADVERTISING PANELS

CROSS-REFERENCE TO RELATED APPLICATIONS

This application claims priority to U.S. Provisional Application Ser. No. 62/627,282 filed on Feb. 7, 2018 the contents of which are herein incorporated by reference in their entirety.

TECHNICAL FIELD

The present invention relates to the field of golf, and, more particularly, to a golf tee box marker device having interchangeable advertising panels.

BACKGROUND

The game of golf has been popular for over a century and its popularity continues to increase with each passing year. Accordingly, many people pass through golf courses every day, providing a unique opportunity to display advertising, and especially promotions specifically directed to a golf-playing audience. Thus, there is a need in the art for a device that increases the visibility of advertising and promotions on golf courses.

SUMMARY

In view of the foregoing background, it is therefore an object of the present invention to provide a device for displaying advertising on golf tee box markers, a previously unappreciated advertising medium. The device includes a base having a planar front surface, a steel plate secured to the planar front surface and having a first polarity, and an advertising panel comprised of a flexible material and having a second polarity. The advertising panel is removably secured to the steel plate using magnetic forces, where the advertising panel has similar dimensions and a shape to the planar front surface of the base. In addition, the device includes a protruding lip extending about a periphery of the planar front surface and around the advertising panel, and a pair of supports extending from a lower portion of the base. Each of the supports is threaded into a lower portion of the base and is configured to be pushed into a ground surface using a sharpened edge until the lower portion of the base is substantially flush to the ground surface. The base may be at an angle relative to a longitudinal axis of the pair of supports causing the advertising panel to be tilted upwards.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The tee box is a location on a golf course where a golfer hits a first ball towards the green of each hole. The tee box location is indicated by at least one pair of golf tee box markers, which are typically brightly colored. The golfer must hit the golf ball from behind an imaginary line formed between the pair of golf tee box markers.

Golfers often must wait to hit their golf ball while golfers ahead of them on the course finish playing the hole and move out of the way. Accordingly, a golf tee box marker device 100 described herein takes advantage of the captive audience of golfers on a tee box in order to expose them to advertisements. The advertisements on the golf tee box marker 100 may promote the golf course itself, a restaurant, or a particular brand of golf products, for example.

Figure 1:
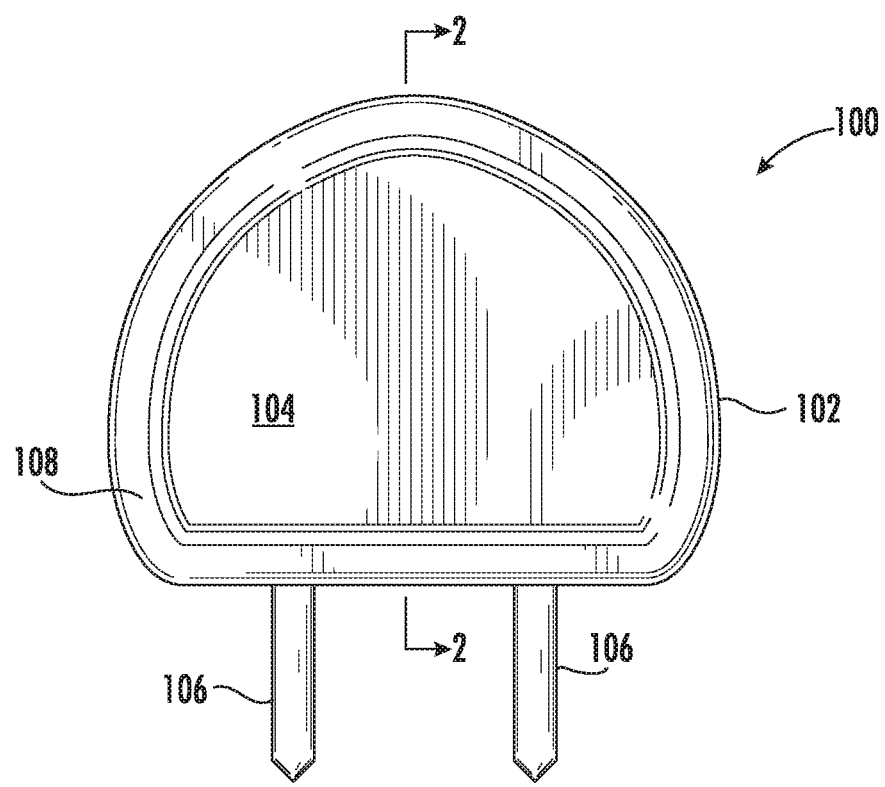
FIG. 1 is a front elevational view of a golf tee box marker device having interchangeable advertising panels in accordance with a particular aspect of the invention.

Referring now to FIG. 1, in a particular aspect of the golf tee box marker device 100 of the present invention includes interchangeable advertising panels. The golf tee box marker device 100 also includes a base 102 having a planar front surface that is configured to receive an advertising panel 104 and that is interchangeable. The advertising panel 104 generally has similar dimensions and a shape to the planar front surface of the base 102.

A periphery of the front surface of the base 102 has a protruding lip 108 that extends around the advertising panel 104. Accordingly, the protruding lip 108 serves to provide a border and to accentuate the advertising panel 104. The advertising panel 104 may have decorative graphics and other indicia displayed thereon.

The base 102 also includes, in a particular aspect, a pair of supports 106a, 106b extending from a lower portion of the base 102. Each of the supports 106a, 106b may be threaded into the lower portion of the base 102. The pair of supports 106a, 106b are configured to be pushed into a ground surface using a sharpened edge 105a, 105b until the lower portion of the base 102 is substantially flush to the ground.

Figure 2:
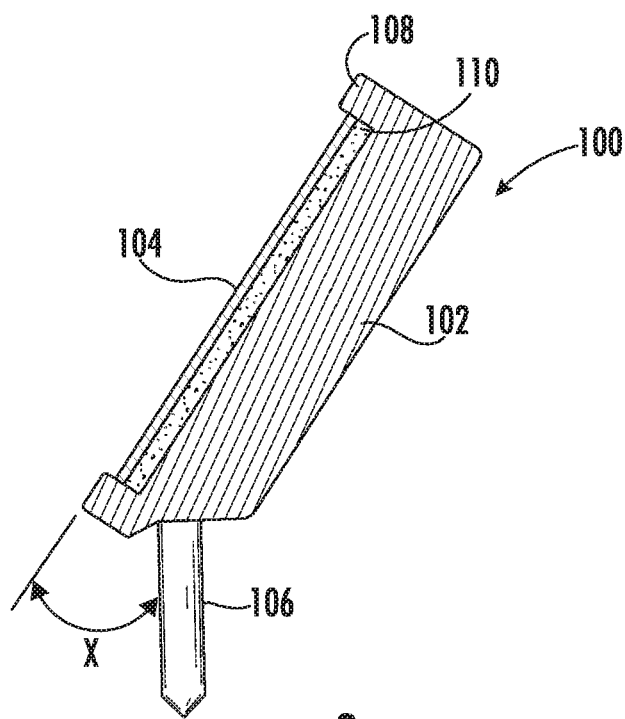
FIG. 2 is a cross sectional view taken in the direction of line 2-2 of FIG. 1.

A cross sectional view of the golf tee box marker device 100 is shown in FIG. 2. In a particular aspect, the base 102 is at an angle "x" between about thirty (30) degrees and sixty (60) degrees relative to a longitudinal axis of the pair of supports 106a, 106b. Thus, when the golf tee box marker device 100 is installed in the ground, the advertising panel 104 can be read by a golfer because the advertising panel 104 is tilted upwards. This makes the advertising panel 104 easier to view in its entirety even when the golfer is standing next to the golf tee box marker device 100.

In a particular aspect, the base 102 is a half-round shape and has a height of 5.45 inches, and the width is 6.90 inches. The angle "x" of the base 102 to the pair of supports 106a, 106b is preferably about thirty-five (35) degrees.

The pair of supports 106a, 106b preferably extend 3.50 inches from the bottom of the base 102, and extend 1.00 inches into the base 102 itself, which is plastic, using threaded inserts 107a, 107b of the base 102. Thus, the overall length of each of the supports 106a, 106b is 4.50 inches. A proximal end of each of the supports 106a, 106b may comprise threading that is configured to matingly engage the respective threaded insert 107a, 107b. Accordingly, one of the supports 106a, 106b can be removed and replaced if it is damaged. A diameter of each of the supports 106a, 106b is 0.375 inches and each may be comprised of anodized aluminum, which prevents corrosion and is lightweight.

The advertising panel 104 is magnetic with a first polarity and is configured to removably adhere to a plate 110 having a second polarity. The plate 110 is integrated within the front surface of the base 102 and is screwed or otherwise secured to the base 102. In a particular aspect, the plate 110 has a thickness of 0.1345 (10ga) and comprised of steel that is painted to match the base 102. The base 102 has rounded edges and is comprised of recycled HDPE plastic and has a thickness of 1.50 inches.

Figure 3:
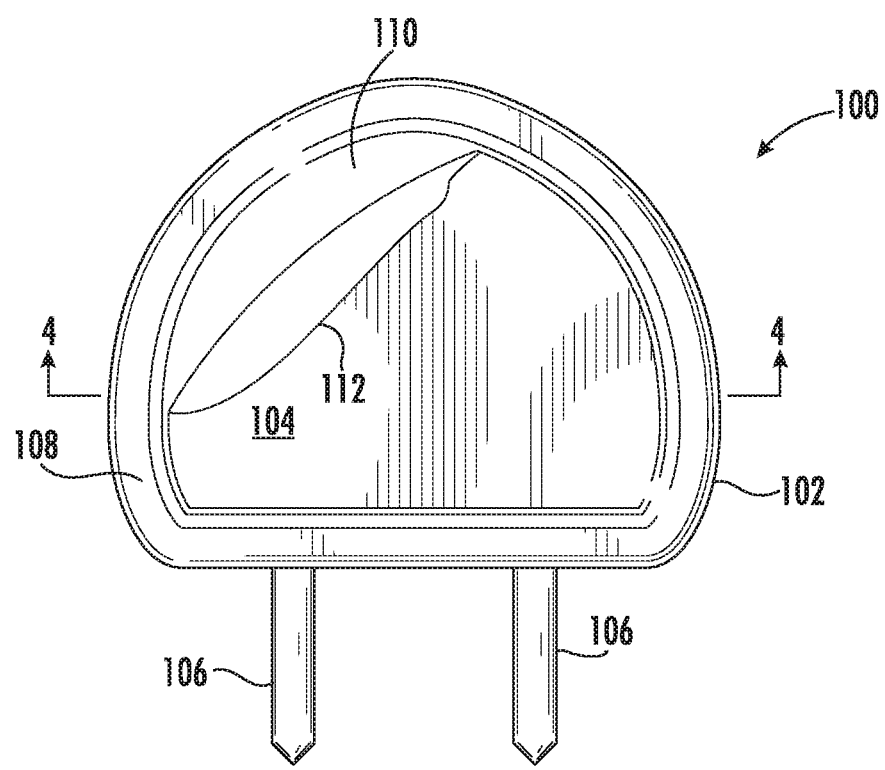
FIG. 3 is a front elevational view of the golf tee box marker device with an interchangeable advertising panel being partially removed.

Accordingly, the advertising panel 104 is comprised of a flexible material and can be peeled off the plate 110 by grasping an edge 112 and pulling as illustrated in FIG. 3. Another advertising panel 104 can then be placed back on the plate 110 to display the desired graphics printed thereon.

The advertising panel 104 may be reversible so that a side that is facing outwards and exposed to the weather can be reversed so that the opposing second side can then be displayed. In some cases both sides may have identical graphics so that when one side is worn, the other side can be displayed. Alternatively, the opposing sides may have different graphics.

Figure 4:
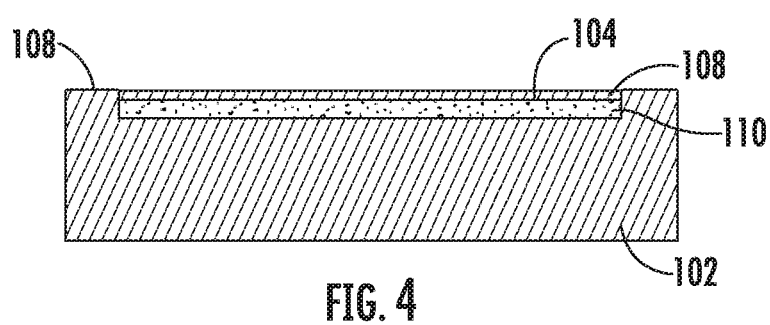
FIG. 4 is a cross sectional view taken in the direction of line 4-4 of FIG. 3.

A cross section of the golf tee box marker device 100 taken in the direction of line 4-4 is shown in FIG. 4. The protruding lip 108 can be seen as extending from the base 102 and having an inside edge that abuts an outer edge of the advertising panel 104. The plate 110 has a similar shape and size of the advertising panel 104.

Figure 5:
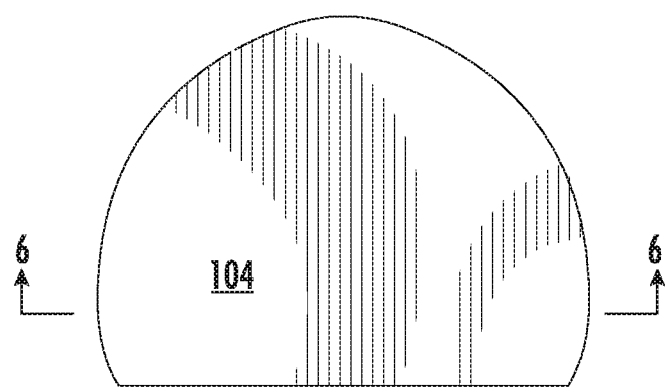
FIG. 5 is a front elevational view of the interchangeable advertising panel removed from the tee box marker device.
Figure 6:
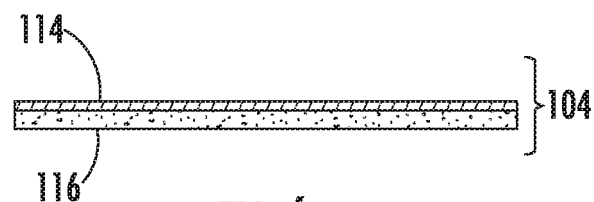
FIG. 6 is a cross sectional view taken in the direction of line 6-6 of FIG. 5.

Referring now to FIGS. 5 and 6 and as explained above, the advertising panel 104 is comprised of a flexible material. In particular, a cross section of the advertising panel 104 taken in the direction of line 6-6 is shown in FIG. 6. In a particular aspect, the advertising panel 104 includes a laminated vinyl layer 114 and an underlying magnetic layer 116 having a second polarity. The vinyl layer 114 and the magnetic layer 116 have similar size, shape, and dimensions. In a particular aspect, the magnetic layer 116 has a thickness of 0.03 inches, and the vinyl layer 114 has a thickness of 0.045 inches.

Figure 7:
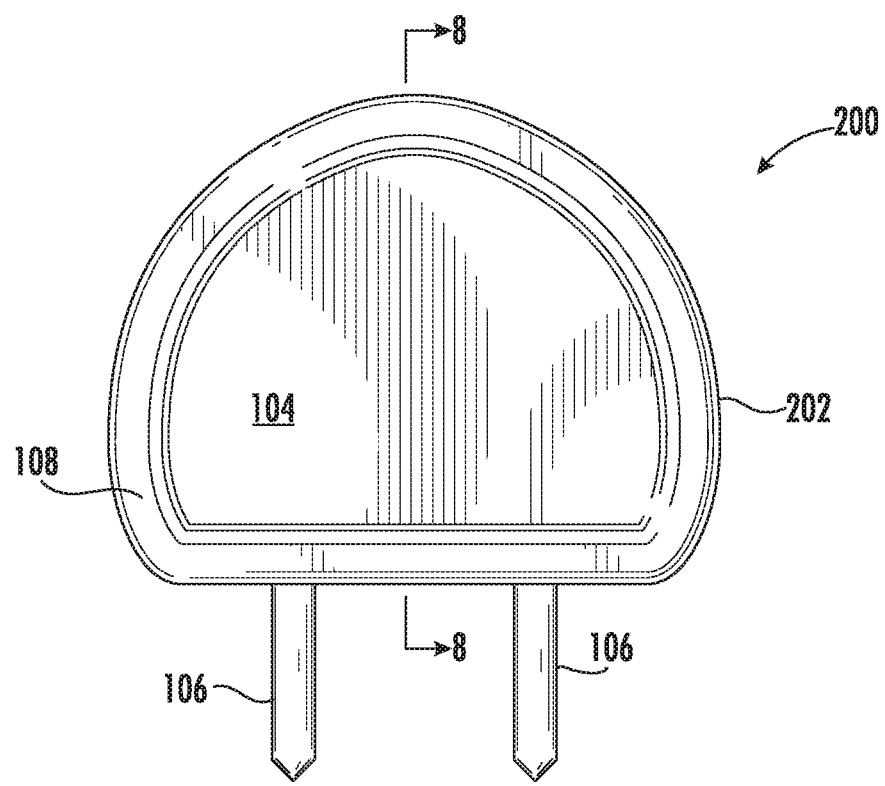
FIG. 7 is a front elevation of a double sided golf tee box marker device in accordance with another aspect of the invention.
Figure 8:
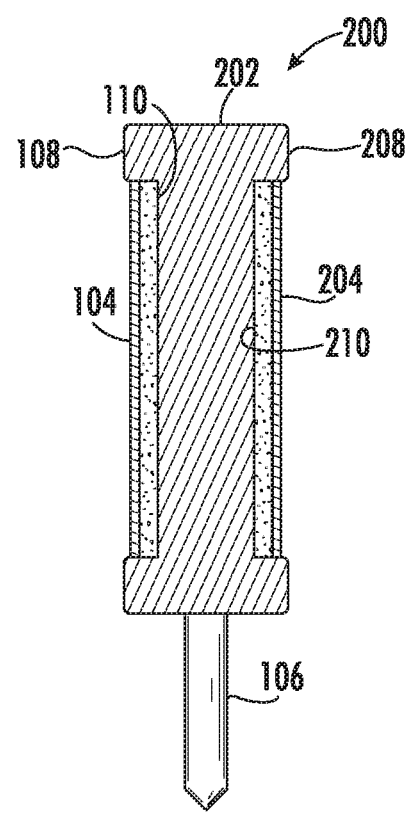
FIG. 8 is a cross sectional view taken in the direction of line 8-8 of FIG. 7.

In another particular aspect of the invention, a double sided golf tee box marker device 200 includes a symmetrical base 202 as shown in FIGS. 7 and 8. On the front side of the double sided base 202 is the plate 110, and on the rear side is a second plate 210. The plate 110 and the second plate 210 are configured to removably secure the advertising panel 104 on the front planar surface, and a second advertising panel 204 on a rear planar surface of the double sided base 202. A periphery of the rear planar surface of the base 202 has a rear protruding lip 208 that extends around the second advertising panel 204. Accordingly, the rear protruding lip 208 serves to provide a border and to accentuate the second advertising panel 204. Similar to the first advertising panel 104, the second advertising panel 204 may have decorative graphics and other indicia displayed thereon.

In addition, the pair of supports 106a, 106b have a longitudinal axis aligned with the symmetric base 202 so that the advertising panels 104, 204 are substantially vertical to the ground surface when the double sided golf tee box marker device 200 is installed.

Figure 9:
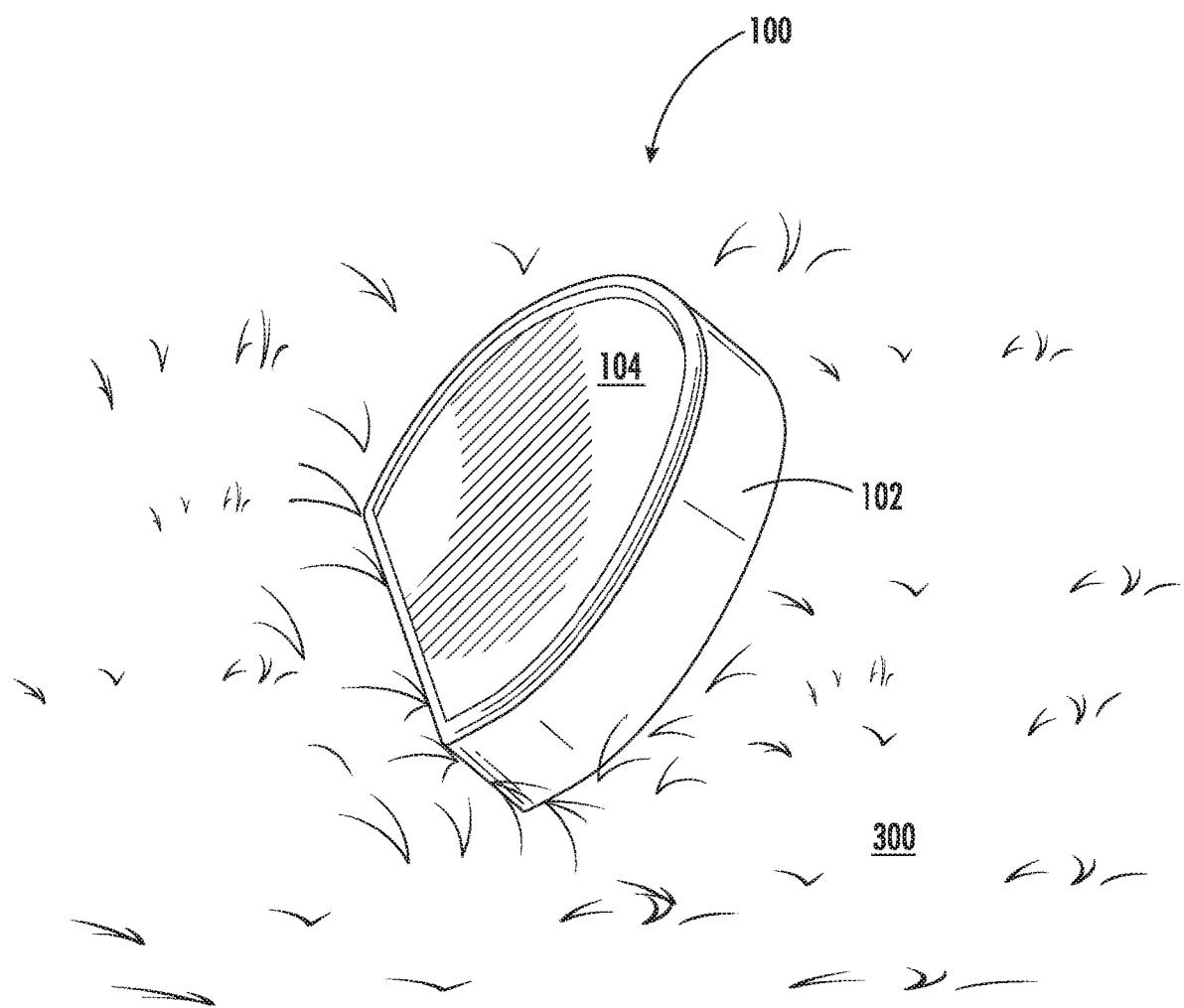
FIG. 9 is a schematic of the golf tee box marker device installed in the ground.

Referring now to FIG. 9, the golf tee box marker device 100 is shown installed in the ground surface 300, where the advertising panel 104 is tilted upwards from the ground surface 300.

As can be appreciated by those of ordinary skill in the art, the base 102 (and the double sided base 202) may have different shapes and dimensions. As can also be appreciated by those of ordinary skill in the art, the pair of supports 106a, 106b may be at any angle to the respective base 102, 202, although the preferred angle is approximately thirty five (35) degrees.

In another aspect, a method of displaying advertising on a golf tee box marker comprising a base having a planar front surface, a plate secured to the planar front surface, a protruding lip extending about a periphery of the planar front surface of the base, and at least one support extending from a lower portion of the base and having a sharpened edge is disclosed. The method includes removably securing an advertising panel over the plate using magnetic forces, and inserting the at least one support into a ground surface using the sharpened edge until the lower portion of the base is substantially flush to the ground surface.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A golf tee box marker device, the device comprising:
   a base comprising non-metallic material and having a planar front surface;
   a plate comprising metal and secured to the planar front surface;
   an advertising panel comprising a magnet having a similar size and shape to the plate and removably secured to the plate using magnetic forces and having similar dimensions and a shape to the planar front surface of the base;
   a protruding lip extending away from the planar front surface and about a periphery of the planar front surface of the base forming a recess on the base, wherein the protruding lip extends away from the planar front surface at least a distance of a combined thickness of the plate and the advertising panel so that the plate and advertising panel are housed within the recess; and
   at least one support extending from a lower portion of the base and configured to be pushed into a ground surface until the lower portion of the base is substantially flush to the ground surface;
   wherein the advertising panel is comprised of a flexible material and can be peeled off the plate.

2. The golf tee box marker device of claim 1, wherein the advertising panel is reversible so that a side that is facing outwards and exposed to the weather can be reversed so that an opposing second side can then be displayed.

3. The golf tee box marker device of claim 1, wherein the advertising panel comprises a laminated vinyl layer having indicia and an underlying magnetic layer.

4. A golf tee box marker device, the device comprising:
- a base having a planar front surface and a rear planar surface;
- a first plate secured to the planar front surface;
- a first advertising panel removably secured over the first plate using magnetic forces;
- a protruding first lip extending about a periphery of the planar front surface of the base and around the first advertising panel secured over the first plate;
- at least one support extending from a lower portion of the base and configured to be pushed into a ground surface until the lower portion of the base is substantially flush to the ground surface;
- a second plate secured to the rear planar surface of the base;
- a second advertising panel removably secured over the second plate using magnetic forces; and
- a second protruding lip extending about a periphery of the planar rear surface of the base and around the second advertising panel secured over the second plate.

5. The golf tee box marker device of claim 4, wherein the planar front surface of the base is at an angle between thirty and sixty degrees relative to a longitudinal axis of the at least one support.

6. The golf tee box marker device of claim 4, wherein the at least one support is threaded into the lower portion of the base.

7. The golf tee box marker device of claim 4, wherein the base is comprised of recycled HDPE plastic.

8. The golf tee box marker device of claim 4, wherein the first and second advertising panels are comprised of a flexible material and can be peeled off the respective first and second plates.

9. The golf tee box marker device of claim 4, wherein the first and second advertising panels are reversible so that a side that is facing outwards and exposed to the weather can be reversed so that an opposing second side can then be displayed.

10. The golf tee box marker device of claim 4, wherein the first and second advertising panels each comprise a laminated vinyl layer having indicia and an underlying magnetic layer.

\* \* \* \* \*